United States Patent
Oka

(10) Patent No.: US 10,069,452 B2
(45) Date of Patent: Sep. 4, 2018

(54) MOTOR DRIVING SYSTEM

(71) Applicant: Toshiba Mitsubishi-Electric Industrial Systems Corporation, Chuo-ku (JP)

(72) Inventor: Toshiaki Oka, Tokyo (JP)

(73) Assignee: Toshiba Mitsubishi-Electric Industrial Systems Corporation, Chuo-ku (JP)

( * ) Notice: Subject to any disclaimer, the term of this patent is extended or adjusted under 35 U.S.C. 154(b) by 0 days.

(21) Appl. No.: 15/348,086

(22) Filed: Nov. 10, 2016

(65) Prior Publication Data

US 2017/0063282 A1 Mar. 2, 2017

Related U.S. Application Data

(63) Continuation of application No. PCT/JP2014/062731, filed on May 13, 2014.

(51) Int. Cl.
*G05B 5/00* (2006.01)
*H02P 21/00* (2016.01)
(Continued)

(52) U.S. Cl.
CPC .............. *H02P 29/10* (2016.02); *H02P 27/06* (2013.01); *H02P 21/0089* (2013.01)

(58) Field of Classification Search
None
See application file for complete search history.

(56) References Cited

U.S. PATENT DOCUMENTS

2009/0237015 A1* 9/2009 Hashimoto ......... H02P 21/0089
318/400.02
2011/0291596 A1 12/2011 Lu et al.
2017/0063282 A1* 3/2017 Oka ....................... H02P 29/10

FOREIGN PATENT DOCUMENTS

JP 1-186187 A 7/1989
JP 2-119599 A 5/1990
(Continued)

OTHER PUBLICATIONS

International Preliminary Report on Patentability and Written Opinion dated Nov. 24, 2016 in PCT/JP2014/062731 (with English translation).
(Continued)

*Primary Examiner* — Bentsu Ro
*Assistant Examiner* — Zemenay Truneh
(74) *Attorney, Agent, or Firm* — Oblon, McClelland, Maier & Neustadt, L.L.P.

(57) ABSTRACT

In a motor driving system, a motor driving system is provided which simplifies the system by ceasing ON/OFF control of a commercial driving command, and by performing commercial synchronous transfer and capture control based on a drive speed reference. A system controller performs synchronization control so as to make a drive output coincident with a phase/amplitude of a commercial AC power source when a rotation speed of a motor exceeds a drive speed reference n2, and when a prescribed requirement is satisfied, the commercial AC power source is synchronously transferred, and the motor is driven by the commercial AC power source. In addition, when the drive speed reference is set to n1, and a drive output side switch is closed, the drive output is connected to the commercial AC power source, and when a prescribed requirement is satisfied, the motor is started to be driven at a variable speed (t7), and thereby the synchronous capture is performed.

3 Claims, 3 Drawing Sheets

1: UPPER CIRCUIT BREAKER
2: INVERTER SECTION
3: DRIVE OUTPUT SIDE SWITCH
4: VOLTAGE TRANSFORMER VT
5: COMMERCIAL OUTPUT SIDE CIRCUIT BREAKER
10: MOTOR (MOTOR)
15: COMMERCIAL AC POWER SOURCE
15a: FIRST COMMERCIAL AC POWER SOURCE LINE
15b: SECOND COMMERCIAL AC POWER SOURCE LINE
20: SYSTEM CONTROLLER
100: MOTOR DRIVING SYSTEM

(51) Int. Cl.
H02P 29/10 (2016.01)
H02P 27/06 (2006.01)

(56) References Cited

FOREIGN PATENT DOCUMENTS

| | | |
|---|---|---|
| JP | 2001-190091 A | 7/2001 |
| JP | 2006-149136 A | 6/2006 |
| JP | 2013-121301 A | 6/2013 |

OTHER PUBLICATIONS

Japanese Office Action dated Aug. 4, 2017 in Japanese Patent Application No. 2016-519021.
Office Action dated Nov. 17, 2017, in European Patent Application No. 14892012.7.
Seggewiss, et al., AFD synchronizing applications: identifying potential, methods and benefits; Industrial Applications Society 48$^{th}$ Annual Petroleum and Chemical Industry Conference. Toronto, Ontario, Sep. 24-26, 2001; pp. 83-89, XP010565292.
Office Action dated Oct. 26, 2017, in the corresponding Korea Patent Application No. 10-2016-7032255 (with English-language Translation).

* cited by examiner

1: UPPER CIRCUIT BREAKER
2: INVERTER SECTION
3: DRIVE OUTPUT SIDE SWITCH
4: VOLTAGE TRANSFORMER VT
5: COMMERCIAL OUTPUT SIDE CIRCUIT BREAKER
10: MOTOR (MOTOR)
15: COMMERCIAL AC POWER SOURCE
15a: FIRST COMMERCIAL AC POWER SOURCE LINE
15b: SECOND COMMERCIAL AC POWER SOURCE LINE
20: SYSTEM CONTROLLER
100: MOTOR DRIVING SYSTEM

MOTOR DRIVING SYSTEM

CROSS-REFERENCE TO RELATED APPLICATION

This application is a continuation application of International Patent Application No. PCT/JP2014/062731, filed on May 13, 2014.

FIELD

Embodiments relate generally to a motor driving system which controls synchronous transfer and capture of a commercial AC power source and a motor.

BACKGROUND

In conventional motor driving systems, there are a drive variable speed driving system which drives a motor by a power supplied from an inverter, and a commercial driving system which drives a motor by a power supplied from a commercial AC power source. In addition, since a drive variable speed driving system can drive a motor while a rotation speed thereof is set to an optional value, a drive variable speed driving (or a drive variable speed operation) which drives (or referred to as operates, the same hereinafter) the relevant motor based on a speed reference designated from the outside of the drive variable speed driving system has been used.

The variable speed operation mode and the constant-speed operation mode may be used by switching in accordance with the speed command of the motor.

FIG. 3 is a timing chart showing an operation of a conventional motor driving system. The example shown in the drawing is an example of a case in which synchronous transfer to switch from drive variable speed driving to commercial driving, and synchronous capture to switch from commercial driving to drive variable speed driving are performed. Hereinafter, the description will be made with reference to this drawing.

In the drawing, a synchronous transfer processing is performed as described below by a system controller (not shown) which controls the motor driving system. The system controller sets a drive driving command (FIG. 3 (1), t1) so as to perform drive variable speed driving of a motor, and sets an external speed reference so as to set a rotation speed of the motor (FIG. 3 (2), t1). In addition, the external speed reference is an example of a case in which a speed reference is set from the outside of the inverter. By the above-described settings of FIG. 3 (1), (2), the rotation of the motor will start, and motor frequency and voltage increase gradually (variable speed driving FIG. 3 (4)), and when the speed of the motor reaches a speed set by the above-described external speed reference, the motor is continued to be driven at the speed (FIGS. 3 (4) t2-t3, drive variable speed operation).

When a commercial driving command is given in this state (FIG. 3 (3), t3) a synchronous transfer processing is performed in the following procedure.

(1) The motor is accelerated until a rotation speed (synonymous with a rotation frequency) thereof reaches a commercial speed (synonymous with a commercial frequency) (t3-t4)

(2) When the rotation frequency of the motor approaches to the commercial frequency, synchronization control to make a drive output coincident with phase and amplitude of the commercial AC power source is performed by phase synchronization control.

(3) Phase and voltage amplitude differences of the drive output and the commercial AC power source are within a setting value, and this state continues for a setting time (XFRDL: synchronous transfer switching speed delay time).

(4) After the state in the above-described (3) has continued for the setting time, a commercial output side circuit breaker 5 is closed (t5).

(5) The drive variable speed driving is stopped (t5).

(6) A drive output side switch (not shown) is tripped.

(7) The synchronous transfer has been completed.

(8) A commercial driving (commercial operation) is performed by the commercial output for a prescribed time (t5-t6).

In addition, at the time of the synchronous transfer, after the synchronous transfer switching speed delay time XFRDL according to the commercial synchronous transfer, a commercial side switch (not shown) is closed at a timing of t5, and the motor is switched to the commercial AC power source side. By this switching, a drive current is cut off (FIG. 3 (5)), and in addition, a commercial current is supplied (FIG. 3 (6)).

For a prescribed time (t5-t6), the commercial driving (commercial operation) by the commercial AC power source is performed.

In addition, when the commercial driving command is turned OFF, and the drive driving command is being given in this state (the same drawing (1), (3), t6), a synchronous capture processing is performed in the following procedure.

(1) When the drive output side switch is closed, the drive output is connected to the commercial AC power source, and thereby a phase synchronization circuit begins to operate.

(2) The phase synchronization circuit detects a frequency/phase/voltage amplitude of the commercial AC power source detected by a voltage transformer VT, and the operation is continued for a setting time (CPTDL: synchronous capture switching speed delay time), while a phase detection difference is within a setting value.

(3) After the state in the above-described (2) continues for the setting time, the commercial output side circuit breaker is tripped.

(4) The drive variable speed driving is started while the phase detected in the above-described (2) is made coincident with the frequency of the commercial AC power source (t7).

(5) The synchronous capture has been completed.

(6) The motor becomes in the drive variable speed driving state (t7-t8).

(7) The drive variable speed driving (drive variable speed operation) is performed by the drive output for a prescribed time (t8-t9).

In addition, at the time of the synchronous capture, after the synchronous capture switching speed delay time CPTDL according to the synchronous capture, the commercial side switch is tripped, and the motor driving is switched to the drive variable speed driving. By this switching, the commercial current is cut off at a timing of t7 (the same drawing (6), t7), and in addition, the drive current is supplied (the same drawing (5), t7).

As described above, in a motor driving system to perform commercial synchronous transfer which switches from drive variable speed driving to commercial driving or synchronous capture which switches from commercial driving to drive variable speed driving, it was necessary to set a drive driving command and a speed reference from the outside, and in addition, it was necessary to execute a commercial driving command.

However, even when the above-described commercial driving command is executed (commercial driving command ON), in order that the operation is actually switched to the commercial driving, it is necessary that after the commercial driving command was given, the rotation speed of the motor has reached the above-described speed reference, and after it was confirmed that the motor was accelerated till the speed of the motor reached the relevant speed reference, the prescribed synchronous transfer switching speed delay time is generated until the synchronous transfer is started. In addition, after the commercial driving, even when the commercial driving command is turned OFF in order to switch the operation to the drive variable speed driving, the synchronous capture switching speed delay time is similarly generated, and then the synchronous capture is performed. That is, the synchronous transfer to the commercial driving is not performed instantly in synchronization with the commercial driving command, but the synchronous transfer is performed after the variable speed driving was performed based on the external speed reference. Accordingly, even when the commercial driving command is substantially omitted, it is possible to obtain the same function, and it is possible to omit the related wiring by omitting the commercial driving command, and thereby an effect to simplify the motor driving system can be obtained.

DETAILED DESCRIPTION

According to one embodiment, a motor driving system comprises drive variable speed driving means connected to a commercial AC power source for driving a motor at a variable speed, a first switch provided between the drive variable speed driving means and the motor, a second switch provided between the commercial AC power source and the motor, commercial driving means for driving the motor by a commercial power outputted from the commercial AC power source, a controller which optionally switches the drive variable speed driving means and the commercial driving means to drive the motor, and a system controller which performs setting for driving the motor to the controller, and is characterized in that the setting includes setting of a drive driving command for driving the motor by the drive variable speed driving means, and setting of a speed reference for setting a rotation speed of the motor, the controller includes synchronous transfer means which, when the drive driving command is set from the system controller, and further the speed reference is set, drives the motor at a variable speed based on the speed reference, and when the rotation speed of the relevant motor exceeds a prescribed speed reference, controls the first switch and the second switch to drive the relevant motor by the commercial AC power source, and switches driving of the motor from the drive variable speed driving to the commercial driving by the synchronous transfer means.

Hereinafter, further embodiments will be described with reference to the drawings.

Embodiment 1

Figure 1:
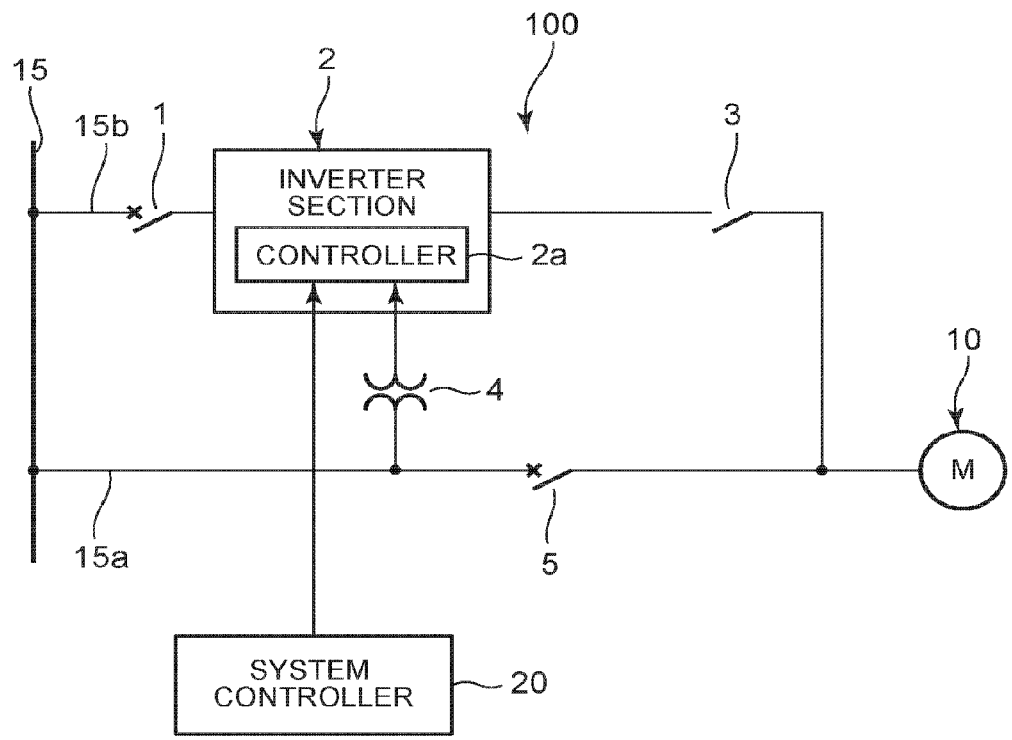
FIG. 1 is a schematic diagram showing a configuration of a motor driving system according to an embodiment 1.

FIG. 1 is a schematic diagram showing a configuration of a motor driving system according to an embodiment 1. A motor driving system shown in the drawing is configured by a commercial AC power source (commercial driving means) 15, an upper circuit breaker 1, an inverter section (drive variable speed driving means) 2, a drive output side switch (first switch) 3, a voltage transformer 4, a commercial output side circuit breaker (second switch) 5, and a load (here, motor (or motor)) 10, and receives a power supplied from the commercial AC power source 15 to operate. Further, a disconnecting switch or a circuit breaker is included in the switch. In addition, the circuit breaker can cut off an electric circuit at the time of short circuit, overcurrent or ground fault, or the like.

The commercial AC power source 15 is provided with a first commercial AC power source line 15a for directly supplying a power of the relevant commercial AC power source 15 to the motor 10 and a second commercial AC power source line 15b for supplying a power of the relevant commercial AC power source 15 to the motor 10 via the above-described inverter section 2.

The first commercial AC power source line 15a is connected to one end of the commercial output side circuit breaker 5, and the other end thereof is connected to the motor 10.

The second commercial AC power source line 15b is connected to one end of the upper circuit breaker 1, and the other end thereof is connected to the inverter section 2, to which a power of the commercial AC power source (for example, AC 100 V, 50 Hz) is supplied.

The inverter section 2 shown in the drawing is configured to have a converter and an inverter. The converter converts (rectifies) the supplied commercial AC power (AC power) into a DC power.

The inverter converts the DC power converted by the converter into an AC power in which both of a voltage and a frequency can be varied. In the inverter of the present embodiment, four switching devices (not shown) connected in series with the DC power source to be supplied are provided, and gate terminals (not shown) of the relevant switching devices are respectively connected to a controller 2a, and the relevant switching devices are controlled by the relevant controller 2a, and thereby an AC power necessary for driving the motor 10 at a variable speed is generated.

The AC power generated by the inverter section 2 in this manner is connected to the motor 10 via the drive output side switch 3.

In addition, an AC power to be generated by the inverter section 2 differs depending on a kind of the motor to become a load. For example, when the motor is a single phase motor, an output of the inverter section 2 is sufficiently a single phase AC power (for example, AC 100 V/50 Hz) of a prescribed voltage, but when the motor is a three phase motor, an output of the inverter section 2 requires a three phase AC power. Any of these powers can be generated by controlling gate terminals of the switching devices composing the inverter.

The controller 2a opens and closes the relevant drive output side switch 3 and the commercial output side circuit breaker 5 at timings described later, to perform synchronous transfer and capture.

Figure 2:
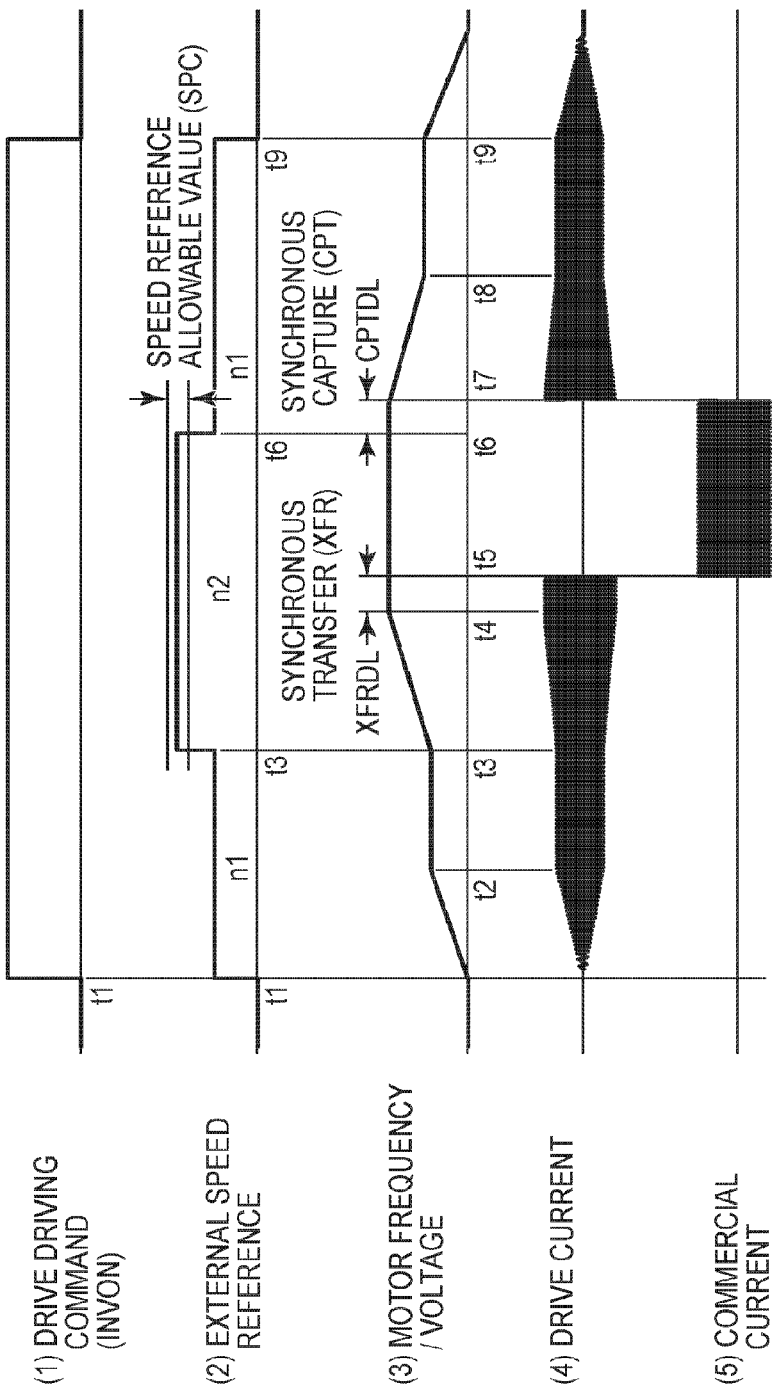
FIG. 2 is a timing chart for explaining an operation of the motor driving system according to the embodiment 1.
Figure 3:
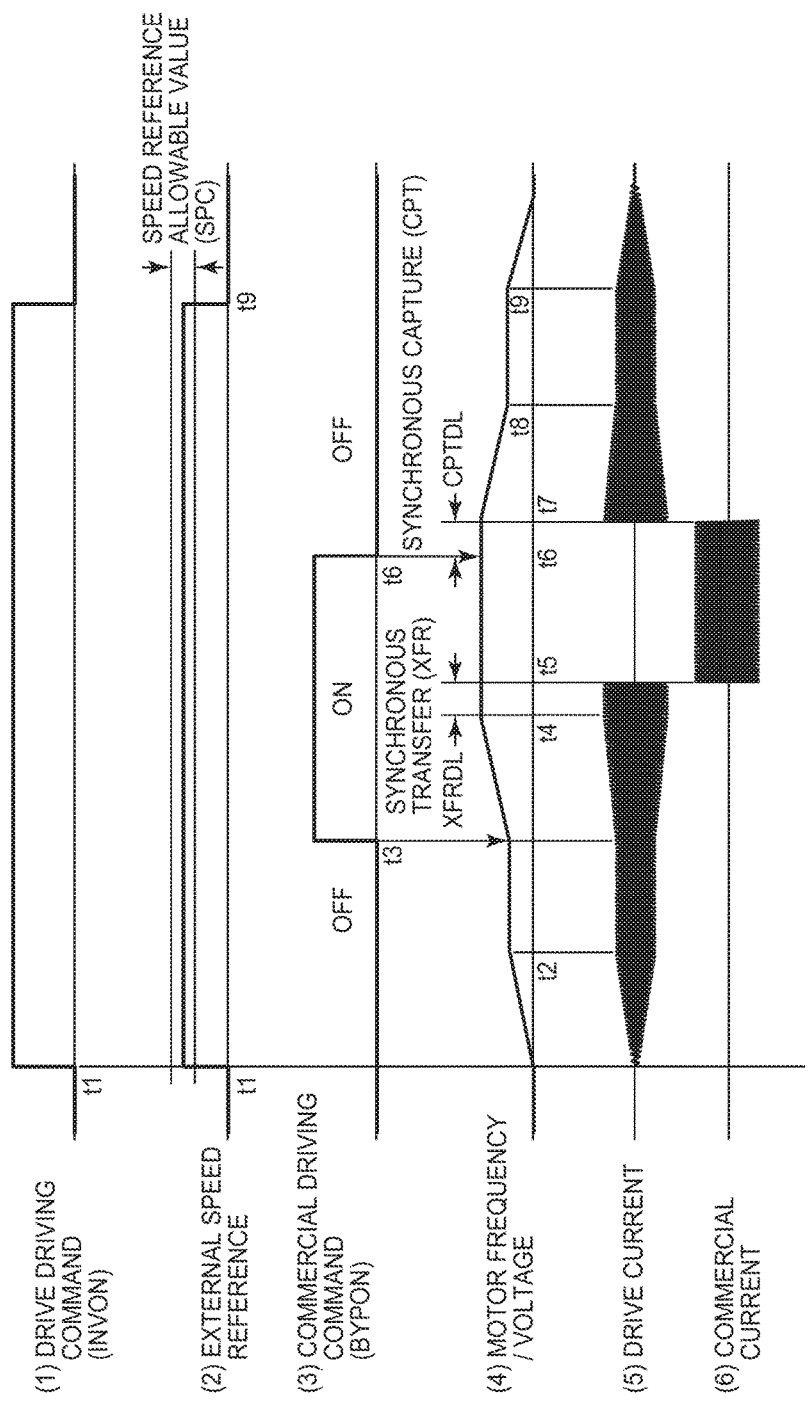
FIG. 3 is a timing chart for explaining an operation of a conventional motor driving system.

FIG. 2 is a timing chart showing an operation of the motor driving system according to the present embodiment. The example shown in the drawing is an example of a case in which synchronous transfer to switch from drive variable speed driving to commercial driving, and synchronous capture to switch commercial driving to drive variable speed driving are performed. Hereinafter, the description will be made with reference to this drawing.

In the drawing, a synchronous transfer processing is performed as described below by a system controller 20 which controls a motor driving system 100. The system controller 20 sets a drive driving command (FIG. 2 (1), t1) so as to perform drive variable speed driving of the motor 10, and in addition, sets a speed reference which sets an external speed reference to n1 (FIG. 2 (2), t1) in order to set a rotation speed of the motor 10. In the present embodiment, this speed reference is set from the system controller 20 to the controller 2a of the inverter section 2. The external speed reference indicates that a speed reference is set from the outside of the inverter section 2.

By the above-described settings of FIG. 2 (1), (2), the motor 1 is started to be driven, and motor frequency and voltage increase gradually (variable speed driving) (FIG. 2 (3)), and when a speed of the motor 10 reaches the speed n1 set by the above-described external speed reference, the motor 10 is continued to be driven at the speed (FIGS. 2 (3), t2-t3).

When the external speed reference is set from n1 to n2 (FIG. 2 (2), t3) in this state, a synchronous transfer processing is performed in the following procedure.

(1) The motor 10 is accelerated until a rotation speed (synonymous with a rotation frequency) thereof reaches the speed n2 (hereinafter, referred to as an external speed reference n2) set by the external speed reference. Accordingly, when the external speed reference n2 is the same as the commercial frequency, the motor 10 is accelerated until the rotation frequency thereof reaches the commercial frequency (t3-t4).

(2) a. when the rotation speed of the motor 10 exceeds the external speed reference n2, or b. when the rotation speed of the motor 10 increases and becomes within a speed reference allowable value SPC which has been set for the external speed reference n2, synchronization control to make the drive output voltage coincident with phase and amplitude of the commercial AC power source is performed by phase synchronization control. Any of the above-described a. or b. is previously set.

In addition, an effect to perform the above-described synchronization control when the rotation speed of the motor 10 becomes within the speed reference allowable value SPC which has been set for the external speed reference n2 is that, for example, the motor is driven by the commercial AC power source at a speed within a commercial speed (for example, 50 Hz/60 Hz)±several %, and in the case of the speed reference except this, the relevant motor is driven at a variable speed by the inverter.

(3) When the phase and voltage amplitude differences of the drive output and the commercial AC power source are within a setting value, and this state continues for a setting time (XFRDL: synchronous transfer switching speed delay time).

(4) After the state in the above-described (3) has continued for the setting time, the commercial output side circuit breaker 5 is closed (t5).

(5) The drive variable speed driving is stopped (t5).
(6) The drive output side switch 3 is tripped.
(7) The synchronous transfer has been completed.

(8) A commercial driving (commercial operation) is performed by the commercial output for a prescribed time (t5-t6). In addition, at the time of the synchronous transfer, after the synchronous transfer switching speed delay time XFRDL according to the commercial synchronous transfer, the commercial side switch 5 is closed at a timing of t5, and the motor 10 is switched to the commercial AC power source side. By this switching, a drive current is cut off (FIG. 2 (4)), and in addition a commercial current is supplied (FIG. 2 (5)).

In addition, the external speed reference is set from n2 to n1 in this state, wherein a. the external speed reference n1 is less than the external speed reference n2, or when b. the external speed reference n1 is not within the speed reference allowable value SPC which has been set for the external speed reference n2 (FIG. 2 (2), t6), a synchronous capture processing is performed in the following procedure. Any of the above-described a. or b. is set previously in accordance with the setting of the above-described (2).

(1) When the drive output side switch 3 is closed, the drive output is connected to the commercial AC power source, and thereby a phase synchronization circuit begins to operate.

(2) The phase synchronization circuit detects frequency, phase and voltage amplitude of the commercial AC power source 15a detected by the voltage transformer 4, and if a phase detection difference is within a setting value, the operation is continued for a setting time (CPTDL: synchronous capture switching speed delay time).

(3) After the state in the above-described (2) continues for the setting time, the commercial output side circuit breaker 5 is tripped.

(4) The drive variable speed driving is started, while the phase detected in the above-described (2) is made coincident with the frequency of the commercial AC power source 15a (t7).

(5) The synchronous capture has been completed.
(6) The motor 10 becomes in the drive variable speed driving state (t7-t8).
(7) The drive variable speed driving (drive variable speed operation) is performed by the drive output for a prescribed time (t8-t9).

What is claimed is:

1. A motor driving system, comprising:
    drive variable speed driving means connected to a commercial AC power source for driving a motor at a variable speed;
    a first switch provided between the drive variable speed driving means and the motor;
    a second switch provided between the commercial AC power source and the motor;
    commercial driving means for driving the motor by commercial power outputted from the commercial AC power source;
    a controller configured to switch between the drive variable speed driving means and the commercial driving means to drive the motor; and
    a system controller configured to set a drive driving command to drive the motor by the drive variable speed driving means, and set speed references for setting a rotation speed of the motor, the speed references including a first speed reference and a second speed reference larger than the first speed reference,
    wherein the controller is further configured to when the drive driving command is set by the system controller, and the first speed reference is set, drive the motor at a variable speed based on the first speed reference, when the second speed reference is set, drive the motor at a variable speed based on the second speed reference, and when the rotation speed of the motor exceeds the second speed reference, or the rotation speed of the motor becomes within a speed reference allowable value that has been set for the second speed reference, control the first switch and the second switch to drive the motor by the commercial AC power source.

2. The motor driving means according to claim 1, wherein the controller is further configured to
   when the drive driving command is supplied from the system controller, and the first speed reference is set, and when the rotation speed of the motor to be driven by the commercial AC power source becomes less than the second speed reference, control the first switch and the second switch to drive the motor at a variable speed.

3. The motor driving means according to claim 2, wherein the controller is further configured to
   when the drive driving command is supplied from the system controller, and the first speed reference is set, and when the rotation speed of the motor to be driven by the commercial AC power source becomes less than the second speed reference, or when the rotation speed of the motor becomes not within a speed reference allowable value that has been set for the second speed reference, control the first switch and the second switch to drive the motor at a variable speed.

\* \* \* \* \*